Figure 1:
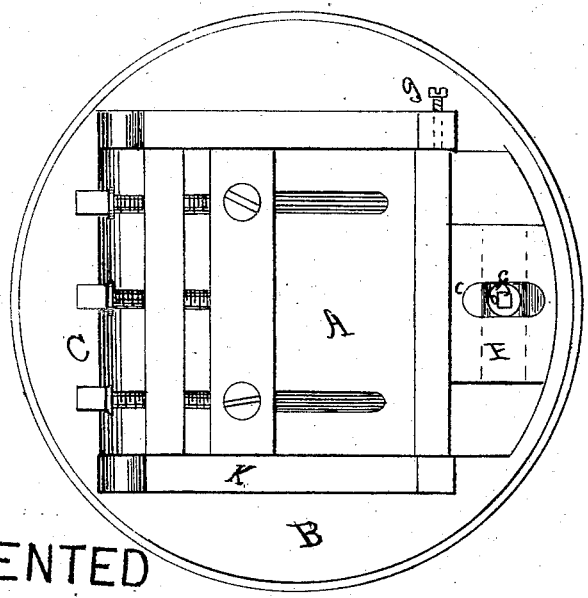

Rufus N Bruce's
impd planer chuck
Springfield Mass

No. 74982

PATENTED
MAR 3 1868

Witnesses
R. F. Hyde
C. S. Clark

Inventor
Rufus N Bruce
by his attys
Gardiner & Hyde

United States Patent Office.

RUFUS N. BRUCE, OF SPRINGFIELD, MASSACHUSETTS, ASSIGNOR TO HIMSELF AND AMOS CALL, OF SAME PLACE.

*Letters Patent No. 74,982, dated March 3, 1868.*

IMPROVED PLANER-CHUCK.

*The Schedule referred to in these Letters Patent and making part of the same.*

TO ALL WHOM IT MAY CONCERN:

Be it known that I, RUFUS N. BRUCE, of Springfield, Hampden county, Commonwealth of Massachusetts, have invented a new and useful improved "Planer-Chuck;" and I do hereby declare that the following is a full and clear description thereof, reference being had to the accompanying drawings, and to the letters of reference marked thereon. In the drawings—

Figure 1 is a plan view, and

Figure 2:
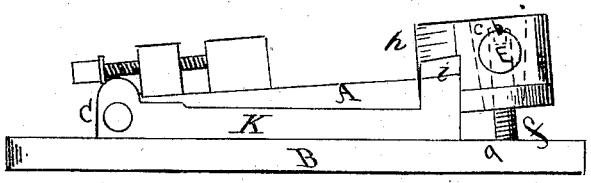

Figure 2 a side view of my planer-chuck.

This invention consists in a planer-chuck, so arranged that the stock can be planed upon any angle of bevel and still be held squarely in between the jaws.

In construction, I form my chuck as follows: The bottom-plate, A, of the vise, is hinged upon the bottom plate, B, of the chuck, by means of projections K and K upon the same, the plate A being also guided by the projections which extend parallel to each other across the plate B, being rigid or forming part of the plate, the plate A fitting in between them when shut down upon the plate B. The hinge is made at one side, at the ends of the projections, and the elevating-device at the other side, and in a line with the centre of the plate A, when said line is drawn parallel to the projections K K. The vise itself consists of two jaws, being crosswise of plate A, one fixed to said plate, the other movable thereon by means of screws, set in a projection forming part of the vise, plate A, near its pivoted side. At the other side of the vise-plate A, and above the elevating-device, is the projection forming the fixed jaw of the vise. This jaw is at right angles to the surface of the plate A, and the stock is held between it and the jaw, moving in slots in the bed-plate A, and worked by the set-screws, as shown and described. This point acting as a pivot, allows the vise-plate A to be raised at one side, opposite to the hinge, so as to present the stock to the cutter at an angle, and the cutter working upon a horizontal plane, now cuts a plane upon the stock, which is at an angle to that which it would cut if the vise were flat down upon the plate B.

The arrangement for adjusting this vise at the proper angle consists of a loose screw, $f$, attached at one end, at $a$, to the chuck-plate B, in such a manner that it has sufficient play to keep at right angles to the vise, as the latter is elevated. This screw is turned by means of a square socket, $b$, in its head, and works in a nut, E, of a cylindrical form, which is set in bearings in the part F of the vise, and crosses the elongated slot $c$ in the part F, so that the screw $f$ has sufficient room for play. This nut E turns easily in its bearings, so that no bind is produced upon the edges of the nut or screw.

In order to give additional firmness to the different positions of the vise, and remove as much strain as possible from the screw $f$ and nut E, a set-screw, $g$, is placed at one side of the vise-frame, and clamps against the vise when it is desired to set it. In fig. 2 is shown an arrangement for gauging the angle of bevel, which consists of a scale, cut properly upon the side of the jaw at $h$. The part $c$ of the frame, or stationary part, is bevelled to an edge, so as to form a marker for this scale.

The advantages of this device are, that the stock can be squarely and securely arranged in the vise, and can then be brought to any angle of bevel, while in the ordinary cases the stock has to be angled by means of wedges placed on each side of it, between the jaws. The scale upon the sides gives a facility for obtaining the proper angle, which cannot be obtained otherwise.

Now, having described my invention, what I claim as new, and desire to secure by Letters Patent, is—

A planer-chuck in which the bottom plate A, of the vise, is hinged at one side to the bottom plate, B, of the chuck, between two projecting guides, K and K, and operated at the other side by an elevating-device, consisting of a screw, F, and loose nut E, the parts being combined and arranged together substantially in the manner described.

RUFUS N. BRUCE.

Witnesses:
EDWARD H. HYDE,
CHAS. T. WORK.